(12) United States Patent
Shigapov (10) Patent No.: US 9,306,951 B1
(45) Date of Patent: *Apr. 5, 2016

(54) GENERATING SECURE ROAMING USER PROFILES OVER A NETWORK

(71) Applicant: F5 Networks, Inc., Seattle, WA (US)

(72) Inventor: Andrey Shigapov, Fremont, CA (US)

(73) Assignee: F5 Networks, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/617,786

(22) Filed: Feb. 9, 2015

Related U.S. Application Data (63) Continuation of application No. 14/080,635, filed on Nov. 14, 2013, now Pat. No. 8,955,050, which is a continuation of application No. 12/113,740, filed on May 1, 2008, now Pat. No. 8,613,045.

(51) Int. Cl.

| | |
|---|---|
| *G06F 7/04* | (2006.01) |
| *G06F 15/16* | (2006.01) |
| *G06F 17/30* | (2006.01) |
| *H04L 29/06* | (2006.01) |
| *H04L 29/08* | (2006.01) |
| *G06F 21/62* | (2013.01) |

(Continued)

(52) U.S. Cl.
CPC ............... *H04L 63/10* (2013.01); *H04L 67/08* (2013.01); *H04L 67/2842* (2013.01); *G06F 9/44* (2013.01); *G06F 9/4443* (2013.01); *G06F 9/4445* (2013.01); *G06F 9/455* (2013.01); *G06F 21/62* (2013.01); *G06F 21/6218* (2013.01); *H04L 67/02* (2013.01); *H04L 67/025* (2013.01); *H04L 67/10* (2013.01)

(58) Field of Classification Search
CPC ....... H04L 67/02; H04L 67/08; H04L 67/025; H04L 63/10; G06F 21/62; G06F 21/6218; G06F 9/4445; G06F 9/44; G06F 9/4443; G06F 9/455
USPC .................. 726/3, 4, 22, 26–28; 718/100–101
See application file for complete search history.

(56) References Cited

U.S. PATENT DOCUMENTS

| 5,991,881 A | 11/1999 | Conklin et al. |
|---|---|---|
| 6,678,828 B1 | 1/2004 | Pham et al. |

(Continued)

OTHER PUBLICATIONS

Remote shell services in SFU, Charlie Russe; (Microsoft MVP for Windows Server Interoperability), Jun. 25, 2004.
Mounting remote filesystems using SSH, Debian Administration, 2004.
Mount a filesystem on your Mac over SSH, Gina Trapani, Mar. 28, 2007.

(Continued)

*Primary Examiner* — Jayesh Jhaveri
(74) *Attorney, Agent, or Firm* — John W. Branch; Lowe Graham Jones PLLC (57) ABSTRACT

Embodiments are directed to providing access to a resource over a network. A client device may request access to a server. An application may be provided to the client device. The application may cause control of the client device to be switched from a first desktop to a secure desktop. The secure desktop may be configured to restrict applications access to within the secure desktop. An indication of the resource on the server to map to may be received at the client device. The indicated resource may be mapped onto a file system on the client device. Mapping may comprise using a remote file access protocol, using DLL injection, or adding a kernel module to an operating system on the client device. The mapped resource may be constrained to be accessed through the secure desktop.

21 Claims, 5 Drawing Sheets

(51) Int. Cl.
*G06F 9/44* (2006.01)
*G06F 9/455* (2006.01)

(56) References Cited

U.S. PATENT DOCUMENTS

| | | | |
|---|---|---|---|
| 6,950,936 B2 | 9/2005 | Subramaniam et al. | |
| 7,461,144 B1* | 12/2008 | Beloussov | G06F 9/5055 |
| | | | 707/999.202 |
| 7,640,409 B1 | 12/2009 | Stafford et al. | |
| 7,725,737 B2 | 5/2010 | Konanka et al. | |
| 7,779,469 B2* | 8/2010 | Hopen | G06F 21/6218 |
| | | | 709/220 |
| 7,984,428 B1 | 7/2011 | Seymour | |
| 2003/0195950 A1 | 10/2003 | Huang et al. | |
| 2003/0212890 A1* | 11/2003 | Dircks | G06F 21/604 |
| | | | 713/164 |
| 2006/0048153 A1* | 3/2006 | Truong | G06F 9/4445 |
| | | | 718/100 |
| 2006/0161970 A1 | 7/2006 | Hopen et al. | |
| 2006/0168136 A1* | 7/2006 | Bethlehem et al. | 709/219 |
| 2007/0101435 A1* | 5/2007 | Konanka | G06F 21/52 |
| | | | 726/27 |
| 2008/0022368 A1 | 1/2008 | Field et al. | |
| 2008/0034408 A1 | 2/2008 | Duggal | |
| 2008/0109912 A1 | 5/2008 | Rivera | |
| 2009/0013030 A1* | 1/2009 | Choudhury | G06F 21/6218 |
| | | | 709/203 |
| 2009/0210934 A1 | 8/2009 | Innes | |
| 2009/0235342 A1 | 9/2009 | Manion et al. | |
| 2010/0146083 A1 | 6/2010 | Vidwans et al. | |

OTHER PUBLICATIONS

Mounting your SSH shares in Microsoft Windows, Hartvig Jensen, Jan. 2, 2008.
Simple Howtos—General SSH Reference, Colin Barschel, 1999.
Mojopac Delivers Desktop Business Continuity to Enterprises, MojoPac Enterprise, http://www.mojopac.com/enterprise/solutions/business_cont.html, accessed Feb. 13, 2008, 2 pages.
MojoPac Enterprises Suitea Managed Virtual Workspace with Flexible Delivery Options, MojoPac Enterprise, http://www.mojopac.com/enterprise/products/index.html, accessed Feb. 13, 2008, 2 pages.
MojoPac Dramatically Simplifies Desktop Management, MojoPac Enterprise, http://www.mojopac.com/enterprise/solutions/manageability.html, accessed Feb. 13, 2008, 1 page.
MojoPac Secures the Enterprise Desktop, MojoPac Enterprise, http://www.mojopac.com/enterprise/solutions/security.html, accessed Feb. 13, 2008, 1 page.
Official Communication for U.S. Appl. No. 12/113,740 mailed Apr. 27, 2011.
Official Communication for U.S. Appl. No. 12/113,740 mailed Aug. 31, 2011.
Official Communication for U.S. Appl. No. 12/113,740 mailed Dec. 7, 2011.
Official Communication for U.S. Appl. No. 12/113,740 mailed May 21, 2012.
Official Communication for U.S. Appl. No. 12/113,740 mailed Aug. 15, 2013.
Official Communication for U.S. Appl. No. 14/080,635 mailed Oct. 9, 2014.

* cited by examiner

GENERATING SECURE ROAMING USER PROFILES OVER A NETWORK

RELATED APPLICATIONS

The present application is a Continuation Patent Application of U.S. patent application Ser. No. 14/080,635, filed on Nov. 14, 2013, issued as U.S. Pat. No. 8,955,050 on Feb. 10, 2015, entitled "GENERATING SECURE ROAMING USER PROFILES OVER A NETWORK," which is a Continuation Patent Application of U.S. patent application Ser. No. 12/113,740, filed on May 1, 2008, issued as U.S. Pat. No. 8,613,045 on Dec. 17, 2013, entitled "GENERATING SECURE ROAMING USER PROFILES OVER A NETWORK," both of which are further incorporated herein by reference in their entireties.

TECHNICAL FIELD

The present invention relates generally to network communications, and more particularly, but not exclusively, to causing a network device to provide a roaming user profile with constrained access to a mapped resource.

BACKGROUND

Users often prefer to login remotely to their accounts from various devices. These devices may be within a firewall, but oftentimes they may be outside a firewall. For example, users may wish to login on a public kiosk device. Nonetheless, data and services should be provided seamlessly and securely. Various roaming profile mechanisms, such as Microsoft's roaming profiles, enable users to login remotely. However, such roaming profile mechanisms are often configured to operate within a firewall, security perimeter, or with trusted devices and/or may require the users to have accounts on the login devices.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the invention, which is to be read in association with the accompanying drawings, wherein.

DETAILED DESCRIPTION

The invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods or devices. Accordingly, the invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meanings of "a," "an," and "the" include plural references. The meaning of "in" includes "in" and "on."

The term "network connection" refers to a collection of links and/or software elements that enable a computing device to communicate with another computing device over a network. One such network connection may be a TCP/IP connection. TCP/IP connections are virtual connections between two network nodes, and are typically established through a TCP/IP handshake protocol. The TCP/IP protocol is described in more detail in Request for Comments (RFC) 793, and/or RFC 1323, which are available through the IETF, and are each herein incorporated by reference.

As used herein, a "tunnel" or "tunneled connection" is a network mechanism that provides for the encapsulation of network packets or frames at a same or lower layer protocol in the layered protocol of the Open Systems Interconnection (OSI) network stack. That is, the tunnel protocol is usually (but not always) at a higher level in the OSI network stack than the payload protocol, or at the same level. Tunneling may be employed to take packets or frames from one network system and place (or encapsulate) them inside of packets or frames from another network system. In one embodiment, tunneling may aggregate flows (example of a flow may include a sequence of packets with a same source/destination IP address and/or port number) between two network devices and transfer them as a single flow. Examples of tunneling protocols include, but are not limited to IP tunneling, L2TP, PPP, PPTP, VPNs, IPSec, GRE, MBone, SSL and TLS.

As used herein, the term "desktop" refers to a Graphical User Interface (GUI) of a device for providing access to an operating system of the device. The desktop may be associated with a user of the device. Different users with different authorization levels may have access to desktops with different capabilities. A desktop may visually encompass the whole display of the device, may provide a taskbar, icons for launching applications, accessing files, changing directories, or the like. Applications are launchable within the desktop.

The term "Dynamic Linked Library (DLL) injection" or simply "injection" refers to a mechanism for causing a process to execute software code that was not originally within the byte code of the application when the application began executing. Injection may provide a replacement Application Programming Interface (API) for a library usable by the application. For example, a replacement API for accessing the file system may be injected. The software code or library is executed within the address space of the application. Techniques for injection include causing the application to load the software code dynamically, e.g., via a DLL, a library, a function, or the like. The software code to be dynamically loaded may be specified in environmental variables or registry entries, and/or by overwriting the byte code of the application itself. DLL injection is described for example in "Programming Applications for Microsoft Windows," by Jeffrey Richter, through Microsoft Press, p. 794, Sep. 29, 1999, and which is incorporated herein by reference. Environmental variables usable in injection include LD_PRELOAD on UNIX based systems. Registry entries may include "AppInit_DLLs."

As used herein, the term "file access protocol" refers to any networking protocol for accessing files and/or directories remotely in real-time. Such file access protocols may include Server Message Block (SMB), Common Internet File System (CIFS), Network File System (NFS), or the like.

As used herein, the term "registry" refers to any computer structure for managing attributes of applications and/or an operating system. Such structure may include a directory, an application, a folder, a script, or the like. In one embodiment, the attributes may be addressable hierarchically, for example, through a tree structure, a path, or the like. The attributes may be stored in at least one file, directory, or the like, within the registry. In one embodiment, a subtree of the attribute hierarchy may be stored in a file. One example of such a registry is Microsoft's registry. One example of a subtree is a Microsoft registry hive. The hive may be stored as a file on a file system.

Embodiments are directed to providing access to a resource over a network. A client device may request access to a server. An application may be provided to the client device. The application may cause control of the client device to be switched from a first desktop to a secure desktop. The secure desktop may be configured to restrict the application's access to within the secure desktop. An indication of the server resource to map to may be received at the client device. The indicated resource may be mapped onto a file system on the client device. Mapping may comprise using a remote file access protocol, using DLL injection, or adding a kernel module to an operating system on the client device, for instance. The mapped resource may be constrained to be accessed through the secure desktop.

Illustrative Operating Environment

Figure 1:
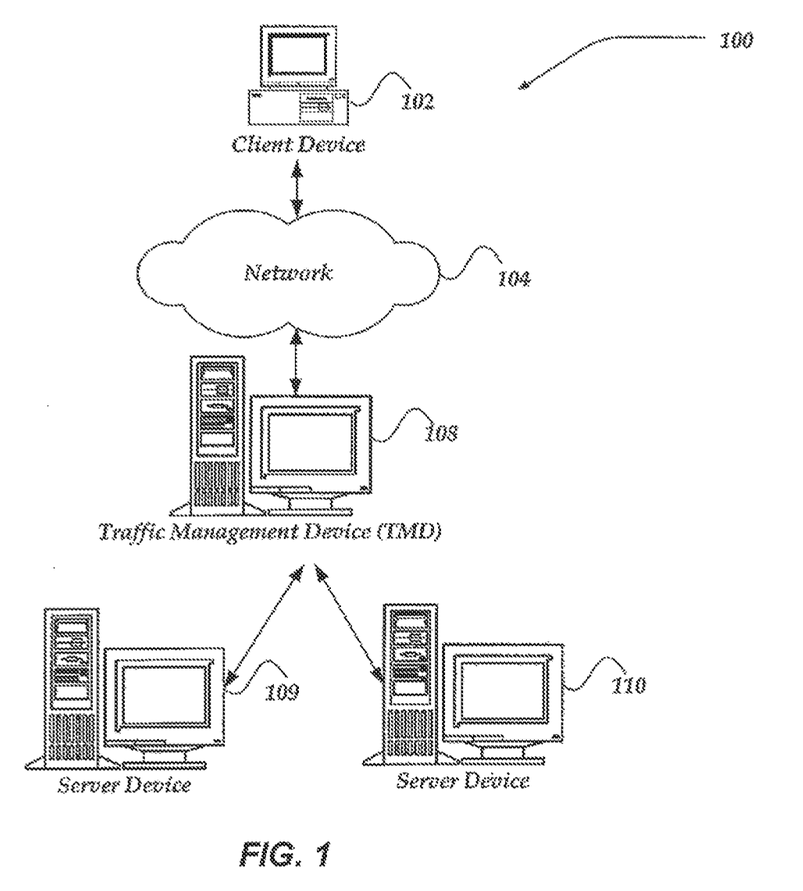
FIG. 1 shows a block diagram illustrating an environment for practicing the invention.

FIG. 1 illustrates one embodiment of an environment in which the invention may operate. However, not all of these components may be required to practice the invention, and variations in the arrangement and type of the components may be made without departing from the spirit or scope of the invention.

As shown in the figure, system 100 includes client device 102, Traffic Management Device (TMD) 108, server devices 109-110, and network 104. TMD 108 is in communication with server devices 109-110, and through network 104 with client device 102. Although not illustrated, a network similar to network 104 may reside between TMD 108 and server devices 109-110.

One embodiment of client device 102 is described in more detail below in conjunction with FIG. 3. Briefly, in one embodiment, client device 102 may include virtually any computing device capable of connecting to another computing device and receiving information. Such devices may also include portable devices such as, cellular telephones, smart phones, display pagers, radio frequency (RF) devices, infrared (IR) devices, Personal Digital Assistants (PDAs), handheld computers, wearable computers, tablet computers, integrated devices combining one or more of the preceding devices, and the like. Client device 102 may also include other computing devices, such as personal computers, multiprocessor systems, microprocessor-based or programmable consumer electronics, network devices, and the like. As such, client device 102 may range widely in terms of capabilities and features. For example, a client device configured as a cell phone may have a numeric keypad and a few lines of monochrome LCD display on which only text may be displayed.

Client device 102 also may include at least one client application that is configured to receive content from another computing device. The client application may include a capability to provide and receive textual content, graphical content, audio content, alerts, messages, and the like. Moreover, client device 102 may be further configured to communicate a message, such as through a Short Message Service (SMS), Multimedia Message Service (MMS), instant messaging (IM), internet relay chat (IRC), mIRC, Jabber, and the like, between another computing device, and the like.

In another example, a web-enabled client device may have a touch sensitive screen, a stylus, and several lines of color LCD display in which both text and graphics may be displayed. Moreover, the web-enabled client device may include a browser application enabled to receive and to send wireless application protocol messages (WAP), and/or wired application messages, and the like. In one embodiment, the browser application is enabled to employ HyperText Markup Language (HTML), Dynamic HTML, Handheld Device Markup Language (HDML), Wireless Markup Language (WML), WMLScript, JavaScript, EXtensible HTML (xHTML), Compact HTML (CHTML), and the like, to display and send a message.

In one embodiment, client device 102 may be configured such that a user may operate the computing device to make requests for data and/or services from other computers on the network. Generally, client device 102 may use process 400 of FIG. 4 to perform at least some of its operations.

In one embodiment, client device 102 may enable a user to log in to client device 102 and/or be authorized to access client device 102. In one embodiment, the user may have an account on client device 102. However, in other embodiments, the user may not have an account and may not be required to be logged in or authorized. For example, client device 102 may be a public Kiosk device.

Client device 102 may request access to one of servers 109-110. In one embodiment, client device 102 may send a request to TMD 108. TMD 108 may authorize and/or otherwise authenticate client device 102 and/or the user of client device 102. In one embodiment, TMD 108 may request at least one of servers 109-110 to perform the authorization/authentication. In one embodiment, the user may be required to have an account on TMD 108 and/or servers 109-110. In one embodiment, the account may be the same account as the account on client device 102, but need not be the same account as the account on client device 102. In any case, if the client device 102 and/or the user of client device 102 is authorized and/or authenticated, client device 102 may receive an application configured to provide access to one of servers 109-110. The application may provide access to resources on servers 109-110 to which client device 102 and/or the user of client device 102 has authorization.

In one embodiment, control of client device 102 may be switched from a currently operating or active desktop to a secure desktop. In one embodiment, the secure desktop is configured to restrict applications access to within the secure desktop. In one embodiment, applications launched or otherwise accessible through the secure desktop may interact or otherwise communicate with each other and with the operating system, but not with other applications launched or otherwise accessible outside of the secure desktop. In one embodiment, the operating system operations available through the secure desktop may also be limited or otherwise restricted. In one embodiment, the restriction may be based on permission or authorization of the user, or the like. For example, the secure desktop may enable reading and opening files, but not writing or deleting files. In general, these access restrictions may act as a sandbox for operations and usage to be within the secure desktop.

Client device 102 may receive over network 104 from TMD 108 an indication of the resource on the server that is mapable on client device 102. The indication may be received within the received application, or received as a separate message. The indication may include a name of the resource, an associated icon, parameters to the resource, or the like. The indicated may be mapped onto a file system of the client device.

At least one icon may provide access to the mapped resource through the secure desktop. If the secure desktop is active and/or the connection to one of servers 109-110 is active, the resource is provided to client device 102. If either the secure desktop is deactivated and/or the connection is closed, the resource is unmapped, and access to the resource is discontinued. In one embodiment, access to the resource may be re-established in subsequent sessions. In a subsequent session, a new mapping to the resource may be enabled within another secure desktop.

In one embodiment, the resource may be stored on the server. Access to the resource may comprise deleting or modifying the resource or otherwise creating other resources. The deletion, modification, or creation may change the resource on the server.

In one embodiment, the resource may be an application, service, directory, registry entry, or the like. For example, the "My Documents" folder for the authorized roaming user may be stored on one of servers 109-110. The "My Documents" folder may be mapped onto the file system of client device 102. A folder icon may be provided within the secure desktop to enable opening the folder, retrieving files from the folder, saving files to the folder, and the like. If the secure desktop is closed and/or the connection is closed, access to "My Documents" is discontinued.

In another embodiment, the mapped resource may be a registry entry for an application and/or the authorized roaming user that is stored on one of servers 109-110. In one embodiment, a temporary registry entry may be created within the registry of client device 102. The temporary registry entry may be mapped to a file on servers 109-110. An injection mechanism may cause function calls to the registry for parameters for an application to access instead the temporary registry entry. If the secure desktop is closed and/or the connection is closed, the temporary registry entry is deleted or otherwise unmapped from the registry.

For example, the temporary registry entry may include parameters to an application such as en email application. The address book, visual presentation, folder organization, or the like for the email application may be stored within the temporary registry entry. The email application executing on the secure desktop may retrieve parameters from the temporary registry entry and may provide the appropriate address book, visual presentation, folder organization, or the like.

In one embodiment, the application and/or client device 102 may create a tunnel through network 104 and/or TMD 108 to servers 109-110 to provide access to the authorized resource. The indication of the resource to map to may be provided over the tunnel. The mapped resources may also be accessible over the tunnel.

Network 104 is configured to couple one computing device with another computing device. Network 104 may be enabled to employ any form of computer readable media for communicating information from one electronic device to another. Also, network 104 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link.

Network 104 may further include any of a variety of wireless sub-networks that may further overlay stand-alone adhoc networks, and the like, to provide an infrastructure-oriented connection. Such sub-networks may include mesh networks, Wireless LAN (WLAN) networks, cellular networks, and the like. Network 104 may also include an autonomous system of terminals, gateways, routers, and the like connected by wireless radio links, and the like. These connectors may be configured to move freely and randomly and organize themselves arbitrarily, such that the topology of network 104 may change rapidly.

Network 104 may further employ a plurality of access technologies including 2nd (2G), 2.5, 3rd (3G), 4th (4G) generation radio access for cellular systems, WLAN, Wireless Router (WR) mesh, and the like. Access technologies such as 2G, 3G, and future access networks may enable wide area coverage for mobile devices with various degrees of mobility. For example, network 104 may enable a radio connection through a radio network access such as Global System for Mobile communication (GSM), General Packet Radio Services (GPRS), Enhanced Data GSM Environment (EDGE), Wideband Code Division Multiple Access (WCDMA), CDMA2000, and the like. In essence, network 104 may include virtually any wired and/or wireless communication mechanisms by which information may travel between one computing device and another computing device, network, and the like.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" include a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

One embodiment of TMD 108 is described in more detail below in conjunction with FIG. 2. Briefly, in one embodiment, TMD 108 may include virtually any device that manages network traffic. Such devices include, for example, routers, proxies, firewalls, load balancers, cache devices, devices that perform network address translation, any combination of the preceding devices, and the like. TMD 108 may, for example, control the flow of data packets delivered to and forwarded from an array of servers, such as server devices 109-110. TMD 108 may direct a request to a particular server based on network traffic, network topology, capacity of a server, content requested, and a host of other traffic distribution mechanisms. TMD 108 may receive data packets from and transmit data packets to the Internet, an intranet, or a local area network accessible through another network. TMD 108 may recognize packets that are part of the same communication, flow, and/or stream and may perform special processing on such packets, such as directing them to the same server so that state information is maintained. TMD 108 also may support a wide variety of network applications such as web browsing, email, telephony, streaming multimedia and other traffic that is sent in packets. The BIG-IP® family of tuning managers, by F5 Networks Inc. of Seattle, Wash., is one example of TMDs. The FirePass® SSL VPN appliances by F5 Networks of Seattle, Wash. are other examples of TMDs. Moreover, TMDs are described in more detail in U.S. Pat. No. 7,102,996 to Amdahl, et al. entitled "Method and System for Scaling Network Tuning Managers," which is incorporated herein by reference.

TMD 108 may restrict access to the resource based on the user's identity and/or authorization level. If client device 102 and/or the user of client device 102 is authorized or authenticated, TMD 108 may respond with an application configured to provide access to one of servers 109-110. TMD 108 may use process 500 of FIG. 5 to perform at least some of its operations.

Server devices 109-110 may include any device configured to communicate data over a network. Server devices 109-110 may receive from client device 102 over network 104 and/or through TMD 108 a request for access to a resource on server devices 109-110. The resource may be a file, data, or information service, including a web service, a web site, or the like. The resource may be accessible through a file system operation operating on server devices 109-110. In response to the request for access to the resource, server devices 109-110 may execute the file system operation to access the resource and may reply with information over network 104 and/or through TMD 108. In one embodiment, server devices 109-110 may include at least one user profile for managing access to the resource by a user. Server devices 109-110 may restrict access to the resource based on the user's identity and/or authorization level.

Devices that may operate as TMD 108, and/or server devices 109-110 include, but are not limited to, personal computers, desktop computers, multiprocessor systems, microprocessor-based or programmable consumer electronics, network PCs, servers, or the like.

Illustrative Network Devices

Figure 2:
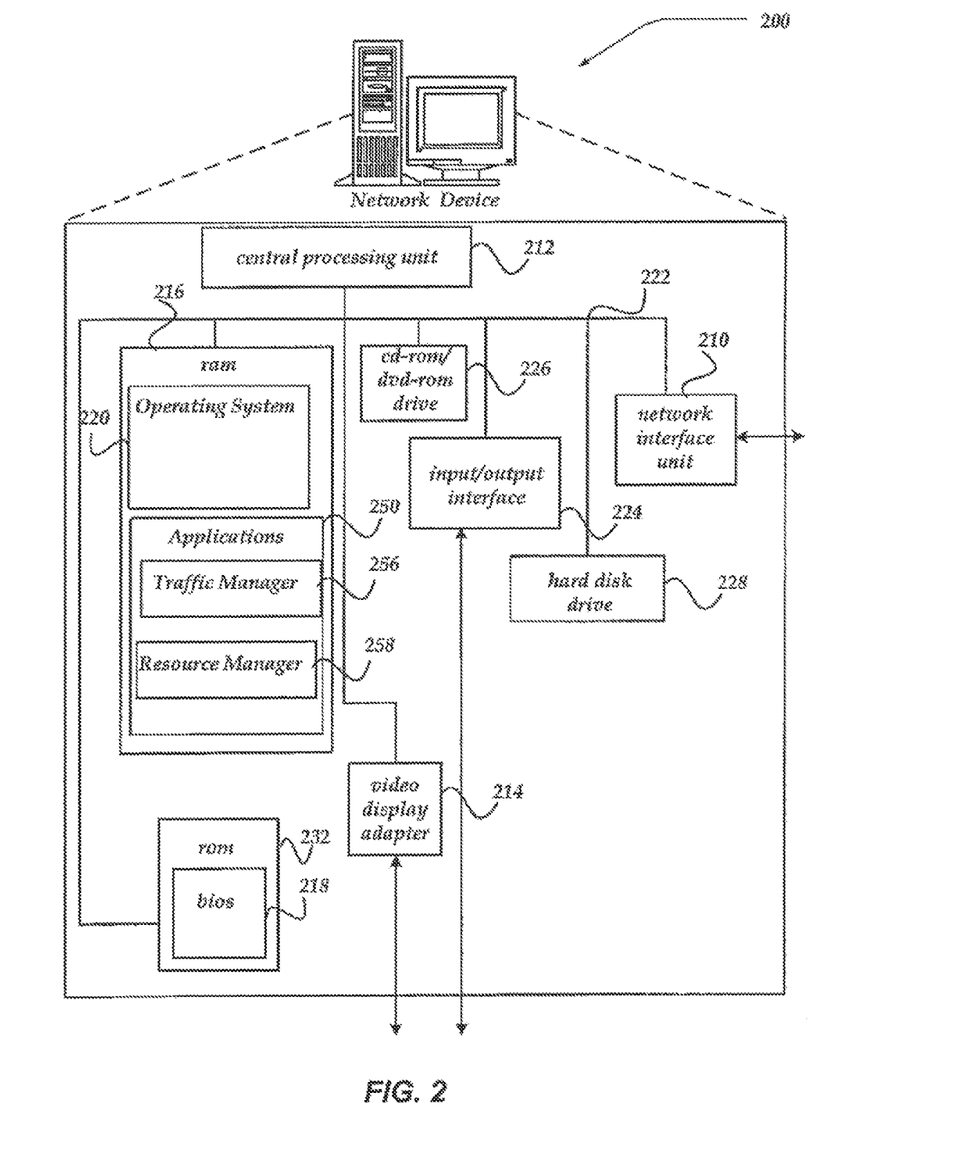
FIG. 2 illustrates an embodiment of network device for practicing the invention.

FIG. 2 shows one embodiment of a network device, according to one embodiment of the invention. Network device 200 may include many more or less components than those shown. The components shown, however, are sufficient to disclose an illustrative embodiment for practicing one or more embodiments of the invention. Network device 200 may represent, for example, TMD 108 or server devices 109-110 of FIG. 1.

Network device 200 includes at least one processing unit 212, video display adapter 214, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of network device 200.

As illustrated in FIG. 2, network device 200 also can communicate with the Internet, or some other communications network via network interface unit 210, which is constructed for use with various communication protocols including the TCP/IP protocol. Network interface unit 210 is sometimes known as a transceiver, transceiving device, or network interface card (NIC).

The mass memory 216,226,228, and 232 described herein and shown in FIG. 2 illustrate another type of computer-readable media, namely computer readable or processor readable storage media. Computer readable storage/machine-readable storage media may include volatile, nonvolatile, removable, and non-removable media implemented in any method or technology for storage of information, such as computer readable/machine-executable instructions, data structures, program modules, or other data, which may be obtained and/or executed by at least one processing unit 212 to perform one or more portions of process 500 of FIG. 5, for example. Examples of computer readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information, including data and/or computer/machine-executable instructions, and which can be accessed by a computing device.

The mass memory may also store other types of program code and data as applications 250, which may be loaded into mass memory and run on operating system 220. Examples of application 250 may include email client/server programs, routing programs, schedulers, web servers, calendars, database programs, word processing programs, HyperText Transfer Protocol (HTTP) programs, Real-Time Streaming Protocol (RTSP) programs, security programs, and any other type of application program.

Network device 200 may also include a Simple Mail Transfer Protocol (SMTP) handler application for transmitting and receiving e-mail, an HTTP handler application for receiving and handing HTTP requests, an RTSP handler application for receiving and handing RTSP requests, and an HTTPS handler application for handling secure connections. The HTTPS handler application may initiate communication with an external application in a secure fashion. Moreover, network device 200 may further include applications that support virtually any secure connection, including TLS, TTLS, EAP, SSL, IPSec, and the like.

Network device 200 may also include input/output interface 224 for communicating with external devices, such as a mouse, keyboard, scanner, or other input/output devices not shown in FIG. 2. Likewise, network device 200 may further include additional mass storage facilities such as cd-rom/dvd-rom drive 226 and hard disk drive 228. Hard disk drive 228 may be utilized to store, among other things, application programs, databases, and the like in the same manner as the other mass memory components described above.

In one embodiment, the network device 200 may include at least one Application Specific Integrated Circuit (ASIC) chip (not shown) coupled to bus 222. The ASIC chip can include logic that performs some or all of the actions of network device 200. For example, in one embodiment, the ASIC chip can perform a number of packet processing functions for incoming and/or outgoing packets.

In one embodiment, network device 200 can further include one or more field-programmable gate arrays (FPGA) (not shown), instead of, or in addition to, the ASIC chip. A number of functions of network device 200 can be performed by the ASIC chip, the FPGA, by CPU 212 with instructions stored in memory, or by any combination of the ASIC chip, FPGA, and a CPU.

Traffic manager 256 is configured and arranged to include any component configured to receive a request for a service (e.g., a DNS domain name resolution request) and to select and to provide the request to a server based on any of a plurality of load-balancing metrics, including network traffic, network topology, capacity of a server, characteristic of the request, a round-robin metric, a domain name requested, or the like.

Resource manager 258 includes any component for managing a resource within network device 200 and on other devices through network interface unit 210. Resource manager 258 may access a list, tree, or the like, of the resources stored in mass memory of network device 200, over network interface unit 210, or the like. Authorization to access the resource may be determined based on a user's type, permission, authorization level or the like. In one embodiment, resource manager 258 may request traffic manager 256 to provide an address to a resource that is accessible over network interface unit 210. Traffic manager 256 may load-balance the request and may provide the resource's address appropriately. In one embodiment, resource manager 258 may provide access to a resource stored within the mass memory of network device 200. In one embodiment, resource manager 258 may send an application to a client device over network interface unit 210, wherein the application is usable for accessing the resource. In one embodiment, resource manager 258 may send over network interface unit 210, an indication of a resource to map to. The indication may include an address, URL, or the like, that is usable by a remote file access protocol to access the resource. The indication may point to a resource on network device 200 or on a server device. Resource manager 258 may then forward message(s) usable for accessing the resource between the client and server device. Resource manager 258 may enable traffic manager 256 to manage the forwarding of the message(s) over network interface unit 210. One embodiment of the operations of resource manager 258 is described in more detail in conjunction with FIG. 5.

Figure 3:
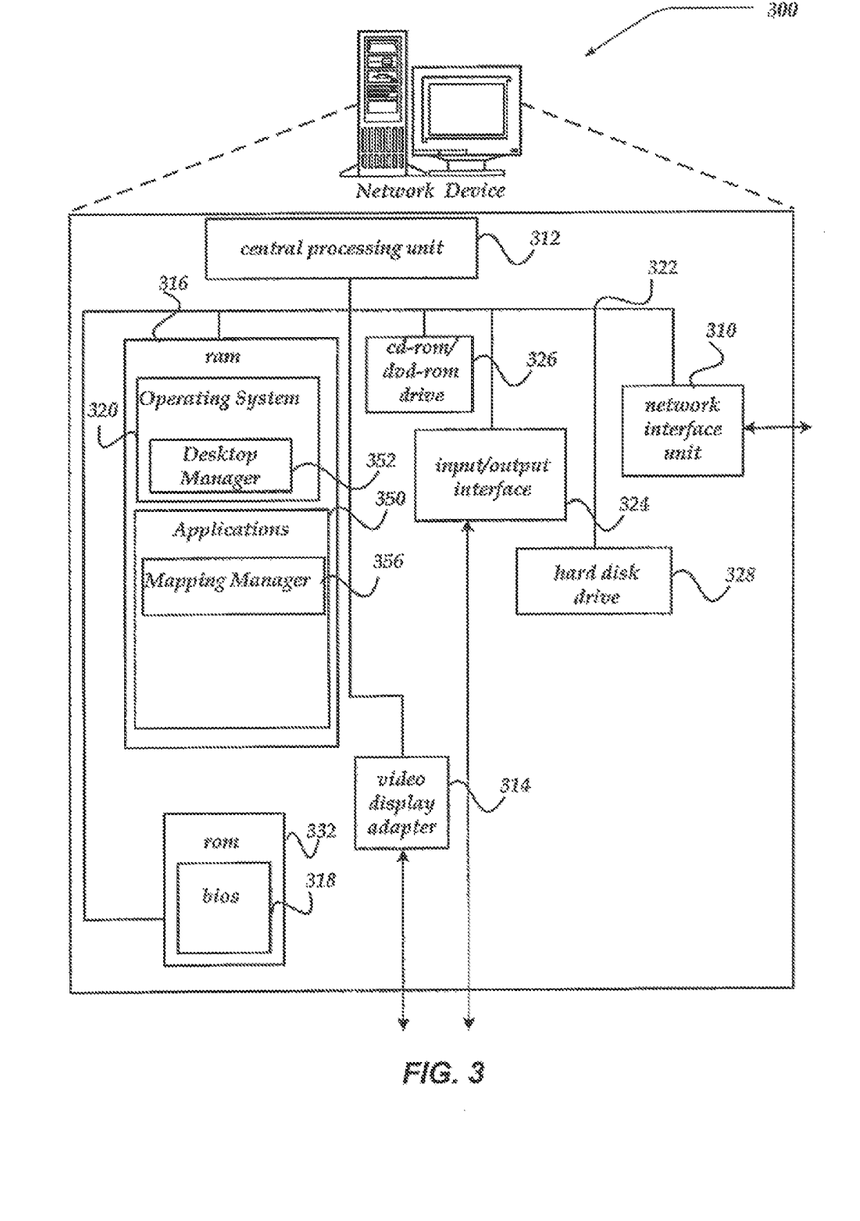
FIG. 3 illustrates an embodiment of client device for practicing the invention.

FIG. 3 shows one embodiment of a client device, according to one embodiment of the invention. Client device 300 may include many more or less components than those shown. The components shown, however, are sufficient to disclose an illustrative embodiment for practicing one or more embodiments of the invention. Client device 300 may represent, for example, client device 102 of FIG. 1.

Client device 300 includes at least one processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of client device 300. Operating system 320 may include at least one service, such as a desktop service, a file system service, a networking service, or the like. The service(s) control the operation of client device 300.

As illustrated in FIG. 3, client device 300 also can communicate with the Internet, or some other communications network via network interface unit 310, which is constructed for use with various communication protocols including the TCP/TP protocol. Network interface unit 310 is sometimes known as a transceiver, transceiving device, or network interface card (NIC).

The mass memory 316,326,328, and 332 described herein and shown in FIG. 3 illustrate another type of computer-readable media, namely computer readable or processor readable storage media. Computer readable storage/machine-readable storage media may include volatile, nonvolatile, removable, and non-removable media implemented in any method or technology for storage of information, such as computer readable/machine-executable instructions, data structures, program modules, or other data, which may be obtained and/or executed by at least one processing unit 312 to perform one or more portions of process 400 of FIG. 4, for example. Examples of computer readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information, including data and/or computer/machine-executable instructions, and which can be accessed by a computing device.

The mass memory may also store other types of program code and data as applications 350, which may be loaded into mass memory and run on operating system 320. Examples of application 350 may include email client/server programs, routing programs, schedulers, web servers, calendars, database programs, word processing programs, HyperText Transfer Protocol (HTTP) programs, Real-Time Streaming Protocol (RTSP) programs, security programs, and any other type or application program.

Client device 300 may also include a Simple Mail Transfer Protocol (SMTP) handler implication for transmitting mid receiving e-mail, an HTTP handler application for receiving and handing HTTP requests, an RTSP handler application for receiving and handing RTSP requests, and an HTTPS handler application for handling secure connections. The HTTPS handler application may initiate communication with an external application in a secure fashion. Moreover, client device 300 may further include applications that support virtually any secure connection, including TLS, TTLS, EAP, SSL, IPSec, and the like.

Client device 300 may also include input/output interface 324 for communicating with external devices, such as a mouse, keyboard, scanner, or other input/output devices not shown in FIG. 3. Likewise, client device 300 may further include additional mass storage facilities such as cd-rom/dvd-rom drive 326 and hard disk drive 328. Hard disk drive 328 may be utilized to store, among other things, application programs, databases, and the like in the same manner as the other mass memory components described above.

In one embodiment, the client device 300 may include at least one Application Specific Integrated Circuit (ASIC) chip (not shown) coupled to bus 322. The ASIC chip can include logic that performs some or all of the actions of client device 300. For example, in one embodiment, the ASIC chip can perform a number of packet processing functions for incoming and/or outgoing packets.

In one embodiment, client device 300 can further include one or more field-programmable gate arrays (FPGA) (not shown), instead of, or in addition to, the ASIC chip. A number of functions of client device 300 can be performed by the ASIC chip, the FPGA, by CPU 312 with instructions stored in memory, or by any combination of the ASIC chip, FPGA, and a CPU.

Desktop manager 352 includes any component for managing a desktop application that controls operating system 320. Desktop manager 352 may manage a plurality of desktops for a plurality of users authorized by operating system 320. Desktop manager 352 may provide a GUI through video display adapter 314 and/or input/output interface 324. In one embodiment, desktop manager 352 may be a Windows desktop, a MAC OS desktop, a window manager, a secure desktop, or the like. In one embodiment, access to data and communications between applications launched by different desktops may be restricted. In one embodiment, desktop manager 352 may restrict a user to access applications launched within a desktop for which the user has permission. In one embodiment, desktop manager 352 may restrict the user from accessing at least a portion of the mass memory of device 300 (e.g., RAM 316, ROM 332, hard disk drive 328). In one embodiment, desktop manager 352 may restrict the user's access based on a user's type, permission, authorization level, or the like.

Mapping manager 356 includes any component for mapping at least one resource to at least a portion of mass memory of client device 300. In one embodiment, mapping manager 356 may use a remote file access protocol to map the portion to a remote resource over network interface unit 310. In another embodiment, mapping manager 356 may use injection to route an API function call of operating system 320. The routed API function call may, instead of accessing a locally stored portion of the mass memory (including a file system), access a remote resource over network interface unit 310. In one embodiment, this remote resource may be a file, folder, and/or registry entry in a registry managed by operating system 320. Operating system 320 may manage the registry and may provide access to the registry through environmental variables, API calls, or the like. The attributes of the registry may be used by at least one of applications 350 to configure its behavior. One embodiment of the operations of resource manager 358 and mapping manager 356 is described in more detail in conjunction with FIG. 4.

Generalized Operation

Figure 4:
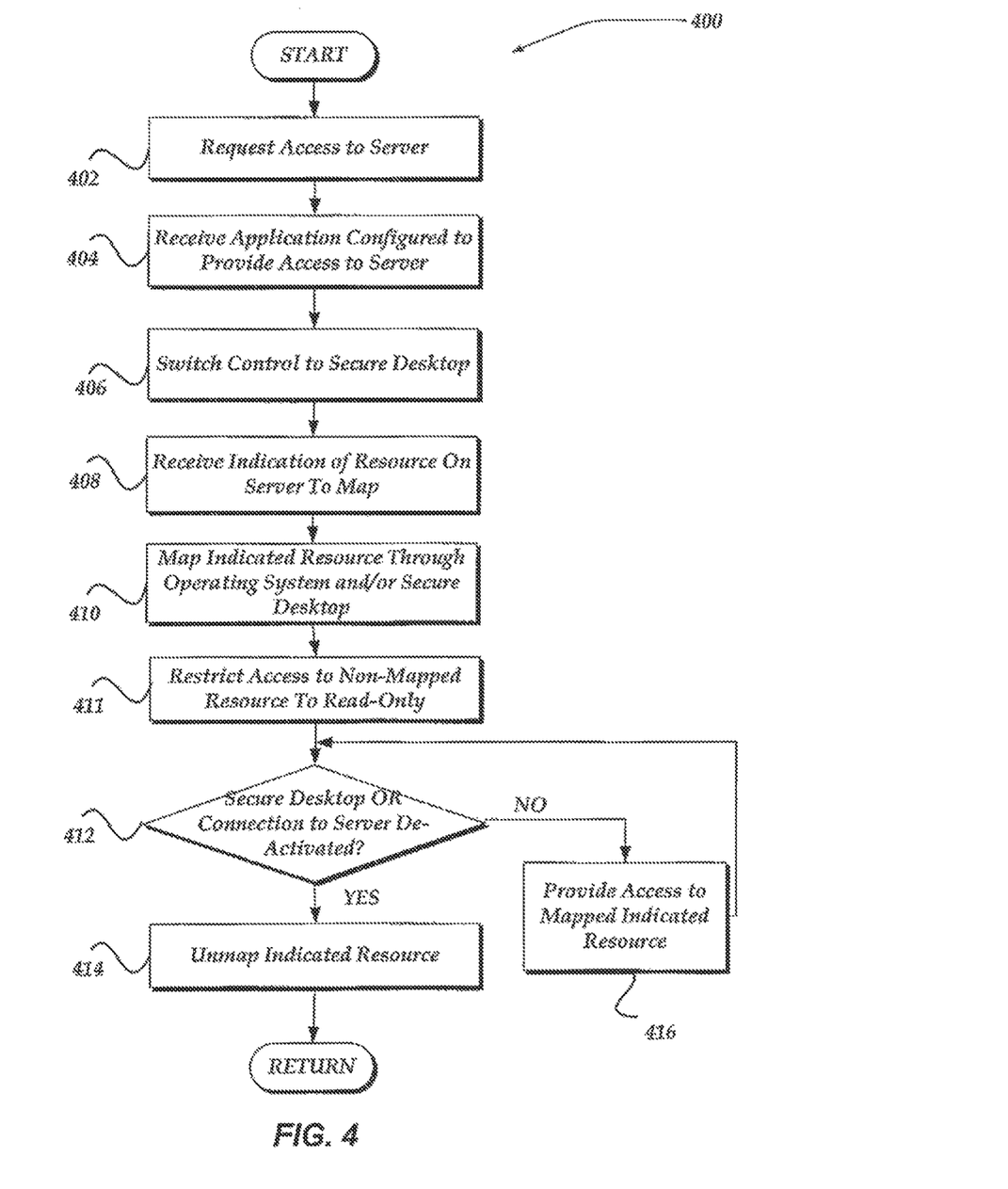
FIGS. 4-5 illustrate logical flow diagrams generally showing embodiments of processes for providing a roaming user profile.

The operation of certain aspects of the invention will now be described with respect to FIGS. 4-5. FIG. 4 illustrates a logical flow diagram generally showing one embodiment of a process for providing a roaming user profile. Process 400 of FIG. 4 may be implemented, in one embodiment, within client device 102 of FIG. 1.

Process 400 begins, after a start block, at block 402, where access to a server is requested. In one embodiment, the request for the access may be sent through a TMD. In one embodiment, access to the server may comprise access to at least one resource on the server. In one embodiment, the resource comprises at least one of a folder restricted to or associated with a user of the client device, an icon for launching an application on the client device, a service accessible from the client device, a temporary file, folder or cache for an application, a registry entry for the application, a mass memory storage, a configuration for an application or service (e.g., launchable within a secure desktop), or the like.

At block 404, an application configured to provide access to at least one resource on the server is received. In one embodiment, the application may be configured for a user or a client device. For example, the application may include information about an authorization and/or resource(s) of the user or device. In one embodiment, a tunnel to the client device may be established. The application may be sent over the tunnel. In one embodiment, the tunnel may employ an Secured Socket Layer (SSL) connection, or the like.

At block 406, control of the client device is switched to a secure desktop. In one embodiment, the application may enable switching to the secure desktop. In one embodiment, the control may be switched from a first desktop to the secure desktop. In one embodiment, the display of the client device may be completely encompassed by the secure desktop. After switching, a user of client device no longer has access to the first desktop, and operations of an operating system of the client device is accessible through the secure desktop but not through the first desktop. Accordingly, the first desktop is disabled.

In one embodiment, the secure desktop may be configured to restrict application access to within the secure desktop. In one embodiment, an application in the secure desktop is restricted from accessing another application outside the secure desktop. That is, applications that are accessible through the secure desktop may communicate with each other but not with applications launched by another desktop. Additionally, a user of the desktop may use applications accessible through the secure desktop but not applications launched by another desktop.

At block 408, an indication of the resource on the server to map to is received. The indication may specify the resource in any form, including as fields in a data message, as an XML document, or the like. In one embodiment, the indication may be received within the application. In another embodiment, the indication may be received separate from the application. In one embodiment, the indication may specify the path within a file system for the resource, a registry hive and/or name for a registry entry, or the like. In one embodiment, the indication may be sent over the tunnel.

At block 410, the indicated resource is mapped. In one embodiment, the application may enable the mapping of the indicated resource by the operating system of the client device and/or through the secure desktop on the client device. In one embodiment, mapping may comprise enabling access to the resource using an operating system operation within the secure desktop, a user program, and/or over a remote file access protocol. In one embodiment, the mapping of the resource is performed using a tunneling protocol. In one embodiment, the mapping may be based on a SMB/CIFS network protocol. Messages for the remote file access protocol may be forwarded between the client device to the server (e.g., at a TMD). In another embodiment, mapping may comprise routing a system call for accessing the resource within the operating system.

In one embodiment, routing may comprise intercepting a system call to access a registry item and modifying the return value to point to a resource on the server. In one embodiment a system call to retrieve the path to "My Documents" may return, instead of "%USER_PROFILE%\My Documents," a path to the server device (e.g., using the remote file access protocol). In another embodiment, routing may comprise intercepting a system call to open a file using at a path. The system call instead opens the file on the server and provides access to the server. A handle may be returned to the resource on the server. In one embodiment, subsequent read/writes may not be intercepted, and may use the existing read/write facilities of the operating system. Routing may be based on an injected API within the operating system's address space. In one embodiment, a DLL may be injected into a Microsoft secure desktop and/or another operating system program or service, such as, for example, Explorer.exe, or the like. In another embodiment, mapping may comprise adding to the operating system, a kernel module configured to provide access to the resource. In yet another embodiment, a user program may include an injected DLL configured to route system calls to the resource. Access to the resource on the client device may be intercepted and routed to a server device.

In any case, the mapping of the resource occurs at the operating system level, which includes the desktop and file system. In one embodiment, the mapped resource is constrained to be operated on by an operating system operation (e.g., file system operation and desktop operation) accessed through the secure desktop. That is, the operations of the operating system that may be used to access other local resources may also be used to access the mapped resource. Accordingly, access to the remote resource appears seamless to a user, as if the resource is available locally. This mapping is in contrast to other mechanisms that provide a remote resource through an application, such as a File Transfer Protocol (FTP) program, a terminal emulator program, a thin-client, such as CITRIX™ or the like. In these other mechanisms, the resource is either transferred completely to the local file system before being accessed, or accessing the resource is mediated through an application (e.g., browser or thin-client).

In one embodiment, the mapping may be performed if an operating system of the client device matches another operating system associated with the resource. For example, the resource may be associated with Windows but not with MAC OS, may be associated with MAC OS and PALM OS but not with UNIX, and so forth. Accordingly, access to an appropriate remote resource executable or accessible on a particular operating system is enabled seamlessly on the operating system.

At block 411, access to a non-mapped resource may be restricted to be read-only. In one embodiment, at least one file, application, folder, or other data that is non-indicated as mapped is restricted to be read-only. In one embodiment, the secure desktop may provide APIs to specify which data is restricted as read-only. In another embodiment, an injection in a file system API within the operating system or other application may restrict access to the non-mapped resource.

At decision block 412, it is determined whether the secure desktop and/or a connection to a server are deactivated. In one embodiment, the secure desktop may be closed by the user or closed through other mechanisms, such as a shutdown, or the like. In one embodiment, the connection may be closed by the user, by network failure, or the like. If the secure desktop and/or the connection to the server are deactivated, processing continues to block 414. Otherwise, processing returns to block 416.

At block 414, the indicated resource is unmapped. In one embodiment, a file access protocol may be closed at the remote server, and no further data access may be provided for the mapped resource. In another embodiment, an injected DLL may no longer transceive requests to a server. In one embodiment, temporary files or other data (such as a page file) associated with the mapped resource may also be deleted. In one embodiment, if any resources were cached on the client device, the resource may also be sent to the remote server to synchronize the data. Processing then returns to a calling process for further processing.

At block 416, the access to the mapped indicated resources is provided. In one embodiment, a user may be enabled to created, delete, or otherwise modify the resource. In one embodiment, the deletion, creation, or modification of the resource may be provided over a remote file access protocol, DLL injection, or the like. In one embodiment, a user may modify the resource on a client device, and the resource may be changed on a server device substantially in real-time. Processing then loops back to decision block 412 for further processing.

Figure 5:
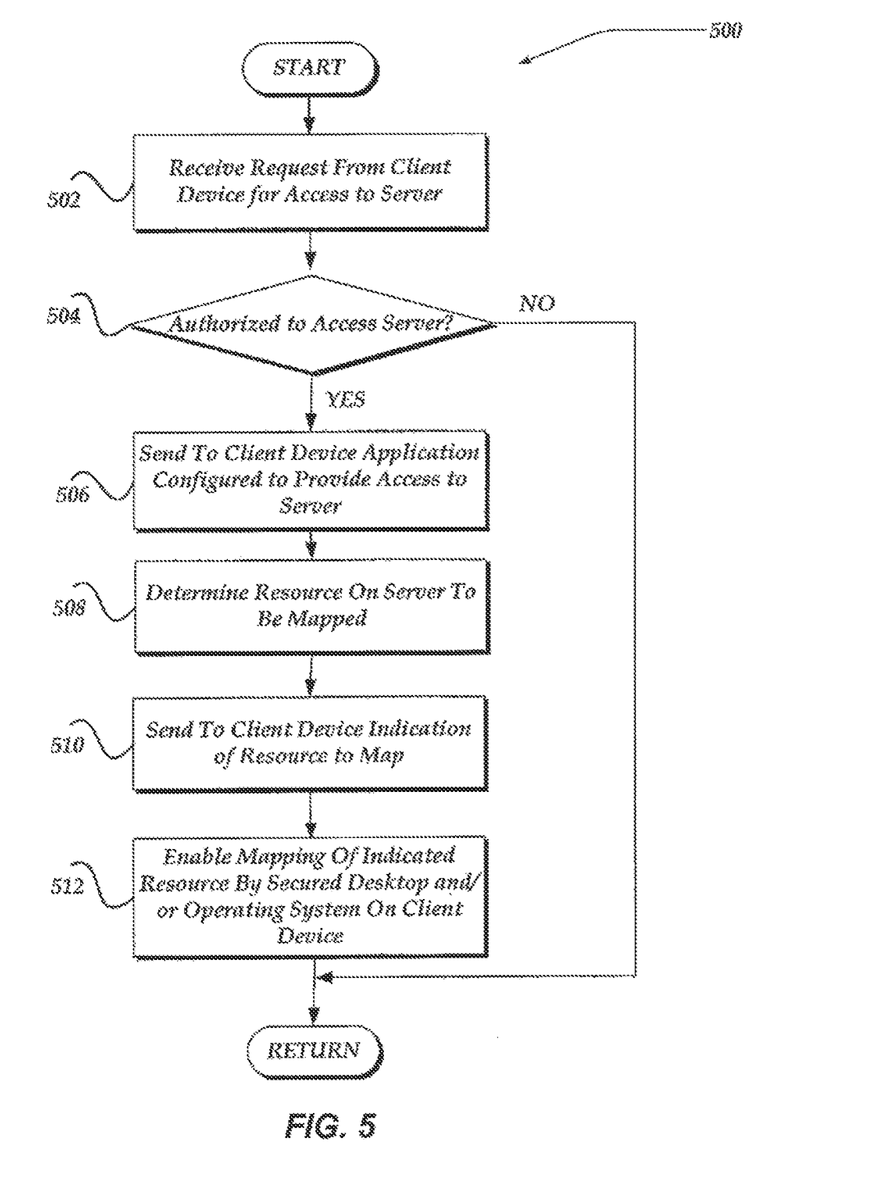

FIG. 5 illustrates a logical flow diagram generally showing one embodiment of a process for providing a roaming user profile. Process 500 of FIG. 5 may be implemented, in one embodiment, within TMD 108 and/or servers 109-110 of FIG. 1. Process 500 begins, after a start block, at block 502, where access to a request from a client device for access to a server is received. In one embodiment, a TMD may receive the request. The TMD may determine which server is to provide the resource. The TMD may load balance the request across a plurality of servers.

At decision block 504, it is determined whether the client device and/or a user of the client device are authorized to access the server. In one embodiment, a username/password may be required, a check of the IP address of a client device requesting access may be made, a cryptographic key may be required, or any other type of authorization or authentication mechanism may be used. In one embodiment, at least one user profile may be retrieved to determine if a user has authorization to access the resource.

At block 506, an application configured to access the server is sent to the client device. In an alternate embodiment, block 506 may be performed before block 504. In this embodiment, the application received by the client device and executing on the client device may enable determining whether the client device and/or the user of the client device is authorized to access the server. In one embodiment, the application may be sent over a tunnel.

At block 508, the resource to be mapped to is determined. In one embodiment, a resource may be determined to be associated with the client device and/or the user requesting access. If the resource is associated, the resource is determined to be mapped. The association may be determined by the authorization level of the user and/or client device. The association may be managed by an administrator through, for example, a user interface. In one embodiment, the resource is determined to be mapped if an operating system of the client device matches another operating system associated with the resource. If there is no match, the mapping to the resource is not enabled or disabled.

At block 510, an indication of the determined resource is sent to the client device. The indication may be generated based on the association and/or the authorization level of the user and/or client device. The indication may be sent over the network separately from the application or/and with the application. In one embodiment, the indication may be sent over a tunnel.

At block 512, a mapping of the indicated resource is enabled by a secured desktop and/or operating system on the client device. In one embodiment, the mapping may be enabled if an operating system of the client device matches another operating system associated with the resource. In one embodiment, a remote file access protocol message may be routed, load-balanced, forwarded, or the like to enable the mapping. In one embodiment, the message may be transceived over a tunnel.

In one embodiment, a mapping of the resource for which a client device or user does not have authorization may be restricted. In one embodiment, the remote file access protocol message may also be inspected to determined appropriate access and/or authorization restrictions. The message requesting access to an unauthorized resource may be ignored, flagged as a security risk, or the like. In one embodiment, each mapping for each user may be restricted within a security sandbox, may be processed within a separate memory space, or the like. Processing then returns to a calling process for further processing.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A network device for providing access to a resource over a network, comprising:
    a memory arranged to store data and instructions; and
    a processor arranged to enable actions embodied by at least a portion of the stored instructions, the actions comprising:
        sending an application over the network to a client device;
        determining an affirmative association between a resource and the client device based on one or more of (i) an authorization level of the client device, or (ii) when an operating system of the client device matches an operating system of the resource;
        sending an indication of the resource to map onto a file system controlled by a secure desktop, the resource being requested by the client device and affirmatively associated with the resource;
        enabling a mapping of the resource onto the secure desktop, wherein the secure desktop is launched on the client device by the application and wherein the mapped resource is constrained to be accessed through the secure desktop such that the mapped resource appears local to the client device, and wherein mapping the resource further includes adding to an operating system of the client device a kernel module configured to provide access to the resource; and
        when the secure desktop is closed, unmapping the resource, and further when the resource is cached on the client device, sending the resource to a server to synchronize the resource with the server.

2. The network device of claim 1, wherein the indication is provided over the network separately from the application to the client device.

3. The network device of claim 1, wherein the indication further comprises one or more of a path within a file system of the resource, a registry hive for the resource, or a name for a registry entry of the resource.

4. The network device of claim 1, further comprising enabling a user of the client device to perform one or more actions, including creating the resource or modifying the resource.

5. The network device of claim 1, further comprising restricting access to an unmapped resource to read only by the client device.

6. The network device of claim 1, wherein the authorization level is based on one or more of a password or a profile.

7. A non-transitory computer-readable storage device having computer-readable instructions stored thereon, which when executed by one or more processors, causes the one or more processors to perform actions, comprising:
    sending an application over the network to a client device;
    determining an affirmative association between a resource and the client device based on one or more of (i) an authorization level of the client device, or (ii) when an operating system of the client device matches an operating system of the resource;
    sending an indication of the resource to map onto a file system controlled by a secure desktop, the resource being requested by the client device and affirmatively associated with the resource;
    enabling a mapping of the resource onto the secure desktop, wherein the secure desktop is launched on the client device by the application and wherein the mapped resource is constrained to be accessed through the secure desktop such that the mapped resource appears local to the client device, and wherein mapping the resource further includes adding to an operating system of the client device a kernel module configured to provide access to the resource; and
    when the secure desktop is closed, unmapping the resource, and further when the resource is cached on the client device, sending the resource to a server to synchronize the resource with the server.

8. The storage device of claim 7, wherein the indication is provided over the network separately from the application to the client device.

9. The storage device of claim 7, wherein the indication further comprises one or more of a path within a file system of the resource, a registry hive for the resource, or a name for a registry entry of the resource.

10. The storage device of claim 7, further comprising enabling a user of the client device to perform one or more actions, including creating the resource or modifying the resource.

11. The storage device of claim 7, further comprising restricting access to an unmapped resource to read only by the client device.

12. The storage device of claim 7, wherein the authorization level is based on one or more of a password or a profile.

13. A system, comprising:
    a plurality of server devices configured to provide access to a resource over a network; and
    a network device having one or more processors that perform actions, including:
        sending an application over the network to a client device;
        determining an affirmative association between a resource and the client device based on one or more of (i) an authorization level of the client device, or (ii) when an operating system of the client device matches an operating system of the resource;
        sending an indication of the resource to map onto a file system controlled by a secure desktop, the resource being requested by the client device and affirmatively associated with the resource;
        enabling a mapping of the resource onto the secure desktop, wherein the secure desktop is launched by the application on the client device and wherein the mapped resource is constrained to be accessed through the secure desktop such that the mapped resource appears local to the client device, and wherein mapping the resource further includes adding to an operating system of the client device a kernel module configured to provide access to the resource; and when the secure desktop is closed, unmapping the resource, and further when the resource is cached on the client device, sending the resource to a server to synchronize the resource with the server.

14. The system of claim 13, wherein the indication is provided over the network separately from the application to the client device.

15. The system of claim 13, wherein the indication further comprises one or more of a path within a file system of the resource, a registry hive for the resource, or a name for a registry entry of the resource.

16. The system of claim 13, further comprising enabling a user of the client device to perform one or more actions, including creating the resource or modifying the resource.

17. The system of claim 13, further comprising restricting access to an unmapped to read only by the client device.

18. The system of claim 13, wherein the authorization level is based on one or more of a password or a profile.

19. The system of claim 13, wherein the mapping of the resource employs a security sandbox.

20. The system of claim 13, wherein the mapping of the resource further comprise routing of a remote file access protocol message through a secure tunnel.

21. The system of claim 13, wherein the application enables access to a user of the client device operating as the public kiosk.

* * * * *